Figure 1:
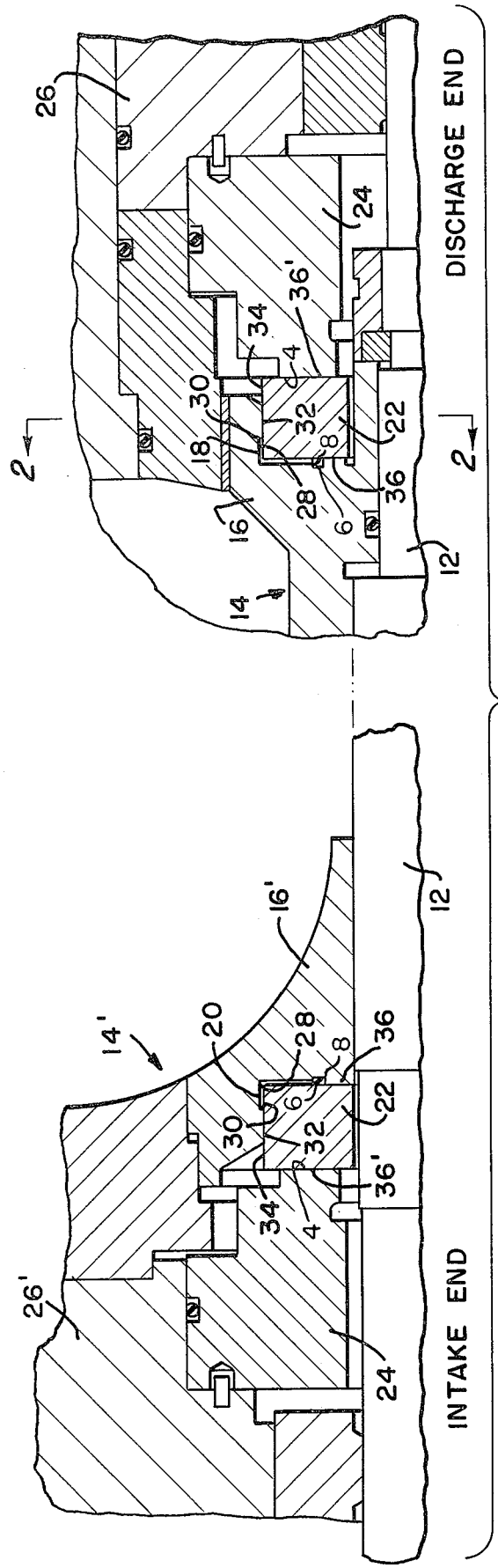

United States Patent [19]

Hornschuch

[11] 3,973,780

[45] Aug. 10, 1976

[54] SEAL MOUNTING ARRANGEMENT

[75] Inventor: Hanns Hornschuch, Easton, Pa.

[73] Assignee: Ingersoll-Rand Company, Woodcliff Lake, N.J.

[22] Filed: Oct. 14, 1975

[21] Appl. No.: 621,938

Related U.S. Application Data

[63] Continuation of Ser. No. 535,799, Dec. 23, 1974, abandoned.

[52] U.S. Cl. .............................. 277/81 R; 277/91; 277/8
[51] Int. Cl.² .......................................... F16J 15/34
[58] Field of Search ............... 277/96, 9, 94, 81 R, 277/237 R, 91, 92, 8; 403/350, 383

[56] References Cited
UNITED STATES PATENTS

| | | | |
|---|---|---|---|
| 2,397,382 | 3/1946 | Smith | 403/350 |
| 2,761,712 | 9/1956 | Ecker | 277/91 |

Primary Examiner—Samuel B. Rothberg
Attorney, Agent, or Firm—Bernard J. Murphy

[57] ABSTRACT

The arrangement comprises means for mounting a rotary type seal, especially a mechanical seal of the dry face type. According to an embodiment of the invention a seal mounting has a substantially circular recess in which a rotary dry face seal is received. Means (not shown) such as a key and keyway, or the like, causes a rotation of the seal mounting in common with a rotary shaft. The mounting disposes the rotary dry face seal for mechanical face sealing with a fixed seal member. The mounting recess has a circumferential inner surface which is out of round, and correspondingly the external periphery of the dry face seal is out of round, the two defining a slidable engagement therebetween. The eccentricity of the cooperating elements causes the seal mounting to engage and carry the sealing element therewith in rotation, in response to shaft rotation, obviating any need to dowel-pin the two elements together.

7 Claims, 2 Drawing Figures

U.S. Patent    Aug. 10, 1976    3,973,780

SEAL MOUNTING ARRANGEMENT

This is a continuation, of application Ser. No. 535,799 filed Dec. 23, 1974, now abandoned.

This invention pertains to mounting arrangements for seals, especially rotary seals of the mechanical or dry face type, and in particular to such sealing arrangements where the sealing element is supported and received by a seal mounting for rotation in common with the seal mounting.

In the prior art it has been customary to bore radial or axial holes in both a seal element and the seal mounting or housing therefor, and disposing therebetween a dowel pin, or the like. This is done to insure that the rotary sealing element is rotated in common with the seal mounting, while the sealing element defines a mechanical, abutting face sealing with an adjacent, juxtaposed, fixed sealing member. The difficulty with this prior art arrangement arises from the necessity of having to precisely locate and align the cooperating dowel holes, and in close quarters accomplish the insertion of a dowel pin (during assembly or re-build). Also, in this arrangement if axial doweling is used, necessarily one face of the seal becomes unusable as a sealing surface, for having been interrupted by a dowel hole.

According to research and testing recently undertaken, it has been determined that sintered materials, such as titanium, tungsten carbide, etc. are admirably suited for use as sealing material. However, when such sintered materials are employed to form sealing elements, for use in very high-speed rotating machinery, such sintered-material seals are subject to fracture and, in fact, explode if the same have grooves, slots, or dowel holes, and the like therein. Such surface discontinuities create stress risers.

It is an object of this invention, therefore, to teach a seal mounting arrangement useable with seals formed of any materials, but which is especially useful for seals formed of sintered materials.

It is a particular object of this invention to define a seal mounting arrangement, for a rotary seal, comprising a rotary seal mounting and a rotary seal wherein said seal is substantially circular, having a radial center, an external periphery, and a central bore; said periphery and bore define first and second, substantially concentric surfaces of said seal, and at least one of said surfaces has first and second radii, defining said one surface with an eccentricity; said mounting has surfaces for receiving and engaging said seal; said mounting and seal are slidably engaged; said mounting having at least one surface which defines an interface with said one surface of said seal; and said one surface of said mounting is spaced from said radial center of said seal a distance which is intermediate those of said first and second radii.

More, it is too an object of this invention to set forth a rotary, face-type sealing means, comprising, a substantially circular sealing element said element having a radial center, an external periphery, and a central throughgoing bore; wherein said periphery and bore define first and second substantially concentric surfaces of said sealing element; and at least one of said surfaces has first and second radii, defining said one surface with an eccentricity.

Figure 2:
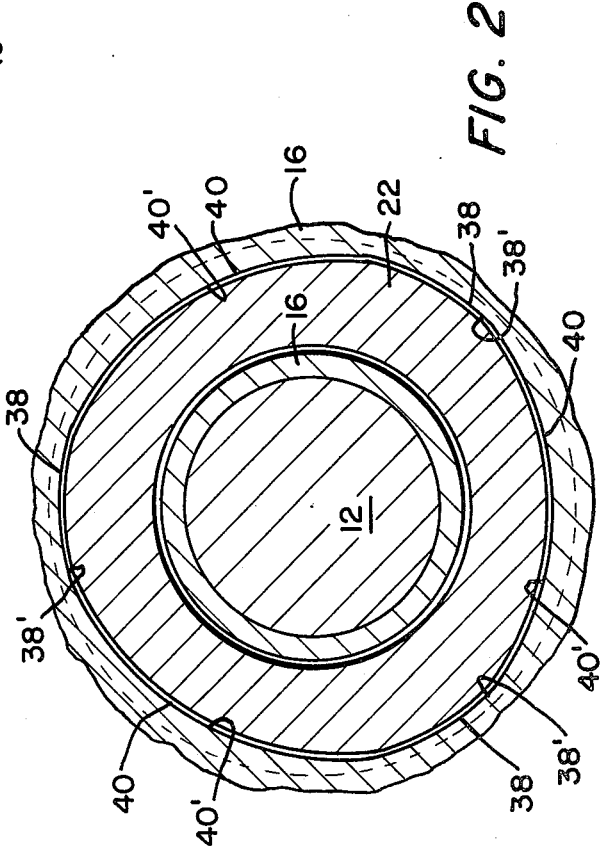

Further objects of this invention, as well as the novel features thereof, will become more apparent by reference to the following description taken in conjunction with the accompanying figures in which:

FIG. 1 is an axial, cross-sectional but discontinuous view of intake and discharge ends of a rotary machine, specifically a gas compressor, in which novel seal mounting arrangements, according to the invention, are employed; and FIG. 2 is a trans-axial, cross-sectional view taken along section 2—2 of FIG. 1.

As shown in the figures, a machine 10 (only a fragment of which is depicted), such as a gas compressor substantially identical to that described in earlier U.S. Pat. No. 3,826,587, issued July 30, 1974, for a Centrifugal Gas Compressor Unit, comprises an impeller shaft 12 rotatable within a housing (not shown) for creating a compressed gas product. Sealing elements are located in the machine at both the inlet end and the discharge ends; the sealing arrangements are shown in part in FIG. 1.

The novel seal mounting arrangements 14 and 14' comprise seal mountings 16 and 16' fitted about the rotary shaft 12 and, through means not shown, the mountings 14 and 14' are rotatable therewith.

Each of the mountings has an annular recess 18, 20 formed therein in which the rotary face seal 22, according to the invention, is engaged or nested. A fixed seal element 24, at both the inlet end (left, FIG. 1) and discharge end (right, FIG. 1), is pinned to a seal retainer 26, 26' to hold the former against rotation.

The seal mountings 16 and 16' each have a first circumferential surface 28 and an annular shoulder 30 which defines an annular lip 32, the latter for defining an interface with the periphery 34 of the nested novel seal 22. The surface of lip 32 is out of round, and so also is the periphery 34 of the seal 22.

As FIG. 2 better illustrates, the seal 22 is centrally bored to receive the shaft 12, has parallel end surfaces 36, 36' (FIG. 1) and the outer periphery 34 thereof is defined by a first major radius 38 and a first minor radius 40. Both radii occur at three, equally spaced-apart lobe locations on the periphery 34, of the seal 22, and the seal mounting 16 (or 16') has a plurality of coves 38' each of which has a major radius slightly greater than the radii 38 of the seal, and intervening land surfaces 40° of slightly greater radii than those obtained in seal 22 intermediate the lobe locations thereof, whereby the seal and mounting can effect a slidable engagement. With rotation of the shaft 12, the seal mounting 16, 16' proceed to rotate and engage the seals 22, and cause the latter to rotate therewith. The radii which define the land surfaces 40' comprise radii which are smaller (shorter) than that of seal radii 38. Thus, accordingly, the land surfaces of the mountings 16 and 16' close upon the seals' radius 38 portions, engage therewith, and carry the seals in rotation. According to this teaching, then, it is unnecessary to bore holes, slots, etc., in end faces 36, 36', of the rotary seals 22, or in the seal mountings 16, 16' to cause the two to rotate in common with the shaft. End faces 36' of the seals 22 define face seals with planar surfaces 4 of the fixed seals 24 with which they are engaged. The opposite end faces 36 of the seals 22 are sealed off by the O-rings 6 engaged therewith and nested in annular recesses 8 provided therefor in mountings 16 and 16'.

In that neither end face of the rotary seals 22 is disrupted, either one, and both thereof, can be used for face sealing purposes. Thus, whatever circumstance will damage and cause a failure of one "using" seal face 36 or 36', it is necessary only to remove the seal 22, and turn it, end for end, and reinstall it into the machine 10. This facility gives the novel seals 22 a double life, a one hundred per cent increase in usefulness.

While the invention has been described in connection with a specific embodiment thereof it is to be clearly understood that this is done only by way of example and not as a limitation to the scope of the invention as set forth in the objects thereof and in the appended claims.

I claim:

1. A seal mounting arrangement, for a rotary seal, comprising:
   a seal rotary mounting; and
   a rotary seal; wherein
   said seal is substantially circular, having a radial center, an external periphery, parallel end surfaces, and a central, axial bore;
   said periphery and bore define first and second substantially concentric surfaces of said seal, and at least one of said surfaces has first and second radii, defining said one surface with an eccentricity;
   said mounting has surfaces for receiving and engaging said seal;
   said mounting and seal are slidably engaged;
   said mounting having at least one surface which, upon rotation of said mounting, effects a contacting engagement with said one surface of said seal;
   said one surface of said mounting is spaced from said radial center of said seal a distance which is intermediate those of said first and second radii;
   said one surface of said mounting and said one surface of said seal define therebetween at least one arcuate, throughgoing void which communicates with both of said end surfaces; and
   a fixed, non-rotating and axially non-yielding seal in abutting engagement with said rotary seal; wherein said fixed seal has a planar surface which fully thereacross forms a face seal with one of said end surfaces of said rotary seal; and further including
   means interposed between said mounting and said rotary seal for sealing the other of said end surfaces of said rotary seal.

2. A seal mounting arrangement, according to claim 1, wherein:
   said central bore of said seal is circular to receive a shaft or the like;
   said one surface of said seal, having said eccentricity, comprises said periphery of said seal;
   said mounting has a substantially circular recess formed therein;
   said seal is nested in said recess; and
   said one surface of said mounting is defined as a surface of said recess.

3. A seal mounting arrangement, according to claim 1, wherein:
   said periphery of said seal has a plurality of arcuate lobes;
   each lobe having an apex having said first radius;
   said recess of said mounting having a plurality of arcuate coves formed therein;
   each of said coves having a radius complementary to, albeit slightly greater than, said first radius.

4. A seal mounting arrangement, according to claim 3, wherein:
   said seal has lands, intermediate said lobes, having said second radius; and
   said recess of said mounting has land surfaces, intermediate said coves, said land surfaces having a radius complementary to, albeit slightly greater than, said second radius.

5. A seal mounting arrangement, according to claim 3, wherein:
   said seal has three of said lobes; and
   said recess has three of said coves.

6. A seal mounting arrangement, according to claim 1, wherein:
   said seal has said first radius at three, equally-distant points about said periphery.

7. A seal mounting arrangement, according to claim 1, wherein:
   said mounting has a plurality of first surfaces spaced said intermediate distance from said radial center, a plurality of second surfaces spaced from said radial center a distance greater than that of said first radius, and a plurality of third surfaces spaced from said radial center a distance greater than that of said second radius.

* * * * *